US011500898B2

(12) United States Patent
Beyer et al.

(10) Patent No.: US 11,500,898 B2
(45) Date of Patent: Nov. 15, 2022

(54) INTELLIGENT MASTER DATA REPLICATION

(71) Applicant: SAP SE, Walldorf (DE)

(72) Inventors: Bertram Beyer, Nussloch (DE); Thomas Bonk, Kirkel-Altstadt (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/105,007

(22) Filed: Nov. 25, 2020

(65) Prior Publication Data

US 2022/0164365 A1    May 26, 2022

(51) Int. Cl.
  *G06F 16/00*    (2019.01)
  *G06F 16/27*    (2019.01)
  *G06F 16/182*   (2019.01)

(52) U.S. Cl.
  CPC .......... *G06F 16/27* (2019.01); *G06F 16/182* (2019.01)

(58) Field of Classification Search
  CPC .............................. G06F 16/27; G06F 16/182
  See application file for complete search history.

(56) References Cited

U.S. PATENT DOCUMENTS

| | | | |
|---|---|---|---|
| 10,547,679 B1 * | 1/2020 | Burnett | H04L 67/1095 |
| 10,671,639 B1 * | 6/2020 | Acheson | G06F 16/273 |
| 11,227,019 B1 * | 1/2022 | Ben-Natan | H04L 67/1097 |
| 2011/0276537 A1 * | 11/2011 | Jegerlehner | G06F 16/27 |
| | | | 707/736 |
| 2013/0290244 A1 * | 10/2013 | Nucci | H04L 67/00 |
| | | | 707/E17.005 |
| 2016/0132576 A1 * | 5/2016 | Qi | G06F 16/27 |
| | | | 707/600 |
| 2016/0179915 A1 * | 6/2016 | Grebnov | G06F 16/2365 |
| | | | 707/624 |
| 2017/0017677 A1 * | 1/2017 | Jolfaei | G06F 16/2358 |
| 2020/0159421 A1 * | 5/2020 | Karumbunathan | G06F 3/0619 |
| 2021/0042292 A1 * | 2/2021 | Gentric | G06F 16/2365 |
| 2021/0209681 A1 * | 7/2021 | Mukherjee | G06F 21/6218 |
| 2022/0029822 A1 * | 1/2022 | Ubbens | G06F 16/27 |
| 2022/0164365 A1 | 5/2022 | Beyer et al. | |

OTHER PUBLICATIONS

"CAP theorem", Wikipedia, [Online], Retrieved from the Internet: <URL: https://en.wikipedia.org/wiki/CAP_theorem>, (2022), 3 pgs.
"Eventual Consistency", Wikipedia, [Online], Retrieved from the Internet: <URL: https://en.wikipedia.org/wiki/Eventual_consistency>, (2022), 2 pgs.

(Continued)

*Primary Examiner* — Alexander Khong
(74) *Attorney, Agent, or Firm* — Schwegman Lundberg & Woessner, P.A.

(57) ABSTRACT

In an example embodiment, a solution is provided that allows for intelligent demand-driven data replication. Only the data that is needed has to be replicated, and this data can be kept only as long as needed. This allows cloud-based applications to be built that integrate deeper with the existing customer landscape with the most efficient data footprint. It allows data types that could not be used before to be integrated into an application. There are additional savings due to the reduced data footprint in the database, compared to a full data replication, without giving up resilience or response time.

20 Claims, 9 Drawing Sheets

(56) References Cited

OTHER PUBLICATIONS

Chandhok, Nikhil, "Web Distribution Systems: Caching and Replication", [Online], Retrieved from the Internet: <URL: http://www.cis.ohio-state.edu/~jain/cis788-99/web_caching/index.html>, (1999), 22 pgs.

Cooper, I, et al., "Internet Web Replication and Caching Taxonomy", RFC 3040, [Online], Retrieved from the Internet: <URL: https://www.rfc-editor.org/rfc/rfc3040>, (Jan. 2001), 64 pgs.

Fielding, et al., "Hypertext Transfer Protocol—HTTP/1.1", RFC 2616, Section 9.3, [Online], Retrieved from the Internet: <URL: https://tools.ietf.org/html/rfc2616>, (Jun. 1999), 353 pgs.

Freeman, John, "Querying data across microservices", Medium, [Online], Retrieved from the Internet: <URL: https://medium.com/@john_freeman/querying-data-across-microservices-8d7a4667668a>, (Sep. 10, 2018), 14 pgs.

* cited by examiner

US 11,500,898 B2

INTELLIGENT MASTER DATA REPLICATION

TECHNICAL FIELD

This document generally relates to systems and methods for use in distributing computing architectures. More specifically, this document relates to intelligent master data replication.

BACKGROUND

Data replication is the process of storing data in more than one site or node. It is useful in improving the availability of data, and generally involves copying data from a database from one server to another server so that users can share the same data by accessing different servers, without losing any consistency among the data.

In modern distributed architectures, replication has become even more important as single modules often do not have access to a system's overall data. These modules may be microservices. A microservice architecture structures an application as a collection of services that are highly maintainable and testable, loosely coupled, and independently deployable.

When creating a monolithic application, it can be easy to take for granted how easy it is to query a single relational database for all data. With a microservice architecture, the data is spread across multiple databases and each microservice accesses its own database. As such, reliable replication of data in a microservice architecture is quite important.

Data replication is different from caching. Caching is reactive. Data only gets cached when it is requested the first time. Caches do not update content automatically; hence, cached data may become outdated. Replication, on the other hand, is reactive. Data is replicated before it is requested, so the first request will be serviced by the replica, and replication services update their data automatically.

Synchronized replication involves cooperation among replicated servers using synchronization strategies and specialized replica protocols to keep the replica data sets coherent. Synchronization strategies range from tightly coherent, which means replication occurs shortly after an update, to loosely coherent, in which there is some delay between an update and replication. Updates occur between replicas based on the synchronization time constraints of the coherency model employed, and generally are in the form of deltas only (e.g., only the updates get replicated).

Demand driven replication, on the other hand, allows replica origin servers to acquire content as needed due to client demand. When a client requests a resource that is not in the data set of the replica origin server or a surrogate, an attempt is made to resolve the request by acquiring the resource from the master origin server, returning it to the requesting client.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

What is needed is an ability to perform replication, rather than caching, in a microservices architecture. To fulfil the resilience and response time requirements of modern cloud applications, it would be useful to obtain the data asynchronously in advance, before required by users. Additionally, what is needed is an ability to perform demand driven, and not synchronized, replication. In modern cloud applications, there are certain data types that have too many entries for a synchronized replication. Such a scenario can easily occur when integrating large customer Enterprise Resource Planning (ERP) systems with new cloud-based Software-as-a-Service (SaaS) solutions. The ERP systems maintain large amounts of master data, which are also used in the new cloud extensions.

Certain data types have a large number of entities, too large for full replication, but the consuming services may only require a small subset of these entries. Furthermore, the data entries might only be used for a short period of time, after which the data is not required.

In an example embodiment, a solution is provided that allows for intelligent demand-driven data replication. Only the data that is needed has to be replicated, and this data can be kept only as long as needed. This allows cloud-based applications to be built that integrate deeper with the existing customer landscape with the most efficient data footprint. It allows data types that could not be used before to be integrated into an application. There are additional savings due to the reduced data footprint in the database, compared to a full data replication, without giving up resilience or response time.

Figure 1:
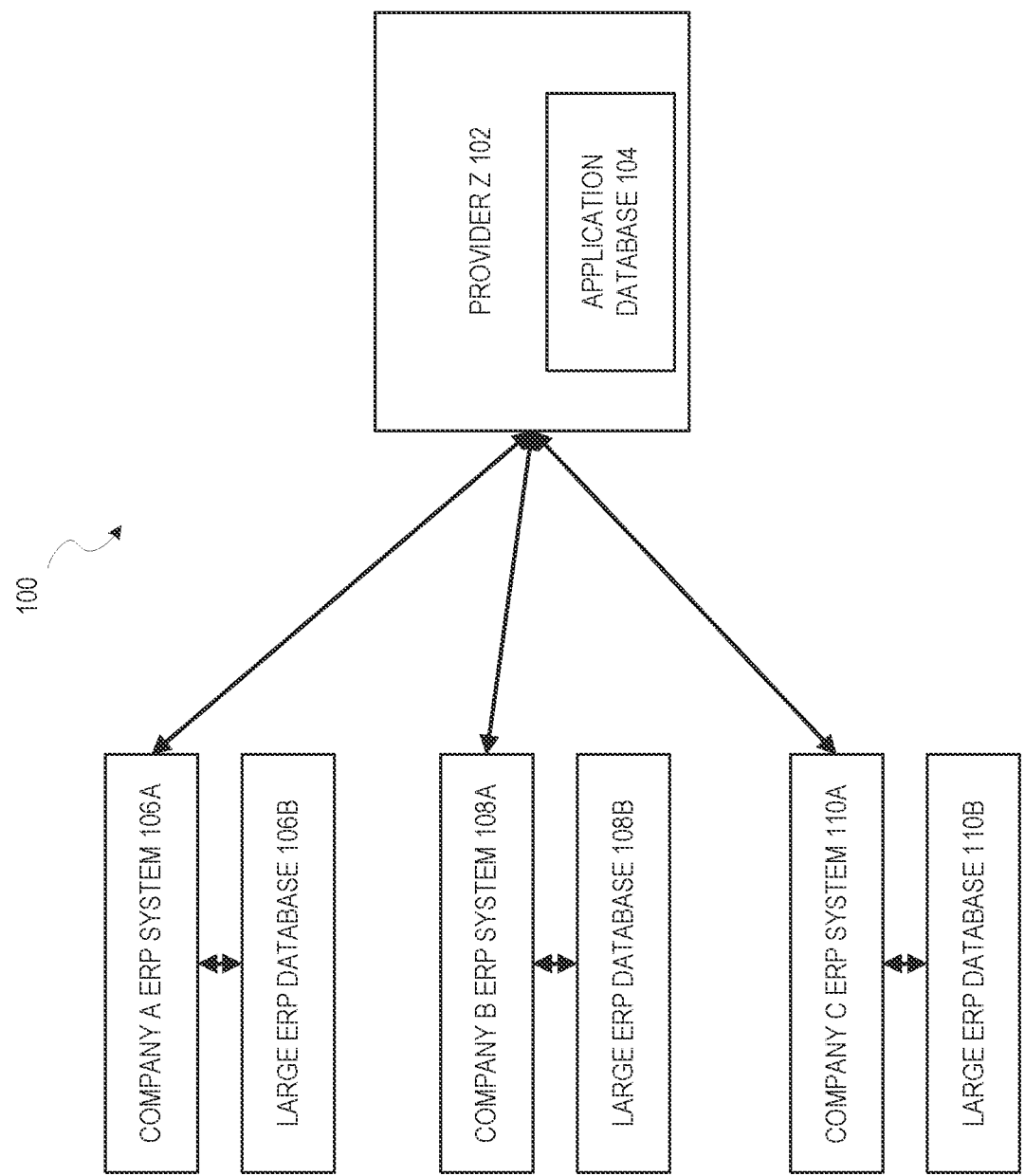
FIG. 1 is a block diagram illustrating an architecture for implementing intelligent master data replication, in accordance with an example embodiment.

FIG. 1 is a block diagram illustrating an architecture 100 for implementing intelligent master data replication, in accordance with an example embodiment. Here, provider Z 102 operates a SaaS application, with its own application database 104. Provider Z 102 may, however, need to access data in the ERP systems of multiple other companies. In this example, there is a separate company A ERP system 106A, company B ERP system 108A, and company C ERP system 110A. Each of these ERP systems 106A, 108A, 110A may have its own dedicated large ERP database 106B, 108B, 110B, respectively.

Provider Z 102 therefore, at some point, will replicate data from the large ERP databases 106B, 108B, 110B into the application database 104. One possibility would be for Provider Z to perform a complete replication of data. Since these databases 106B, 108B, 110B are so large, however, full replication is infeasible. Another possibility would be for provider Z to send a synchronous request each time data is needed. This, however causes latency and resilience issues. Latency would be an issue because each step would then require an additional call against the external large ERP databases 106B, 108B, 110B, which then each could not proceed until the corresponding system responded. Database joints could not be used and would need to be performed at the service level. Resilience would be an issue because if one of the largest ERP databases 106B, 108B, 110B were not available (e.g., because it is down if there are network outages), the data would not be able to be retrieved and Provider Z's 102 SaaS application would be down as well.

As such, in an example embodiment, provider Z 102 replicates only required data into the application database 104. Therefore, costs for database storage are reduced and network traffic is optimized. Data types with very large numbers of entries could still be utilized, and database joins could also be used, which optimizes processing speed. Runtime speed could be enhanced, as the amount of indexed data that would need to be searched is limited. Furthermore, customer systems and a provider system would be more decoupled. When the replication is in sync, all other processing steps of the provider do not depend on the customer system. This decreases processing time and request time and increases resilience.

As an example, provider Z 102 provides an application that generates a questionnaire to send to customers of various companies. It therefore utilizes data from company A ERP system 106A, company B ERP system 108A, and company C ERP system 110A, each of which may pay provider Z to send out the questionnaires and gather the data. As such, provider Z 102 may need to access event data (such as transaction data) from company A ERP system 106A, company B ERP system 108A, and company C ERP system 110A in order to determine to whom to send the questionnaires and what questions to ask.

Further, at a later time, provider Z 102 needs to create a web page to show a table, with each row of the table being a combination of details of customer orders, as well as results of the questionnaire.

In an example embodiment, required master data is identified and stored. Outdated and requested master data is then retrieved and replicated from the corresponding ERP system. Master data maintenance is then performed where outdated master data and master data that is not referenced anymore is retrieved and deleted.

For purposes of this disclosure, event data is any data that references other data, while master data is any data that is referenced by other data. Referenced in this context means that the referenced data is not itself contained in the referencing data, but some sort of indication of how to identify and/or locate the referenced data is contained in the referencing data. As such, the event data contains some indication of how to identify or locate the master data. For example, the event data may be an invoice that contains information about two or more parties to a transaction. The invoice may contain an identifier for each of the parties, and this identifier may be used to retrieve master data that contains more details about the parties, such as their full names, addresses, contact information, and so forth. Those additional details are not contained in the event data but the indication that could be used to retrieve those additional details is contained in the event data.

Figure 2:
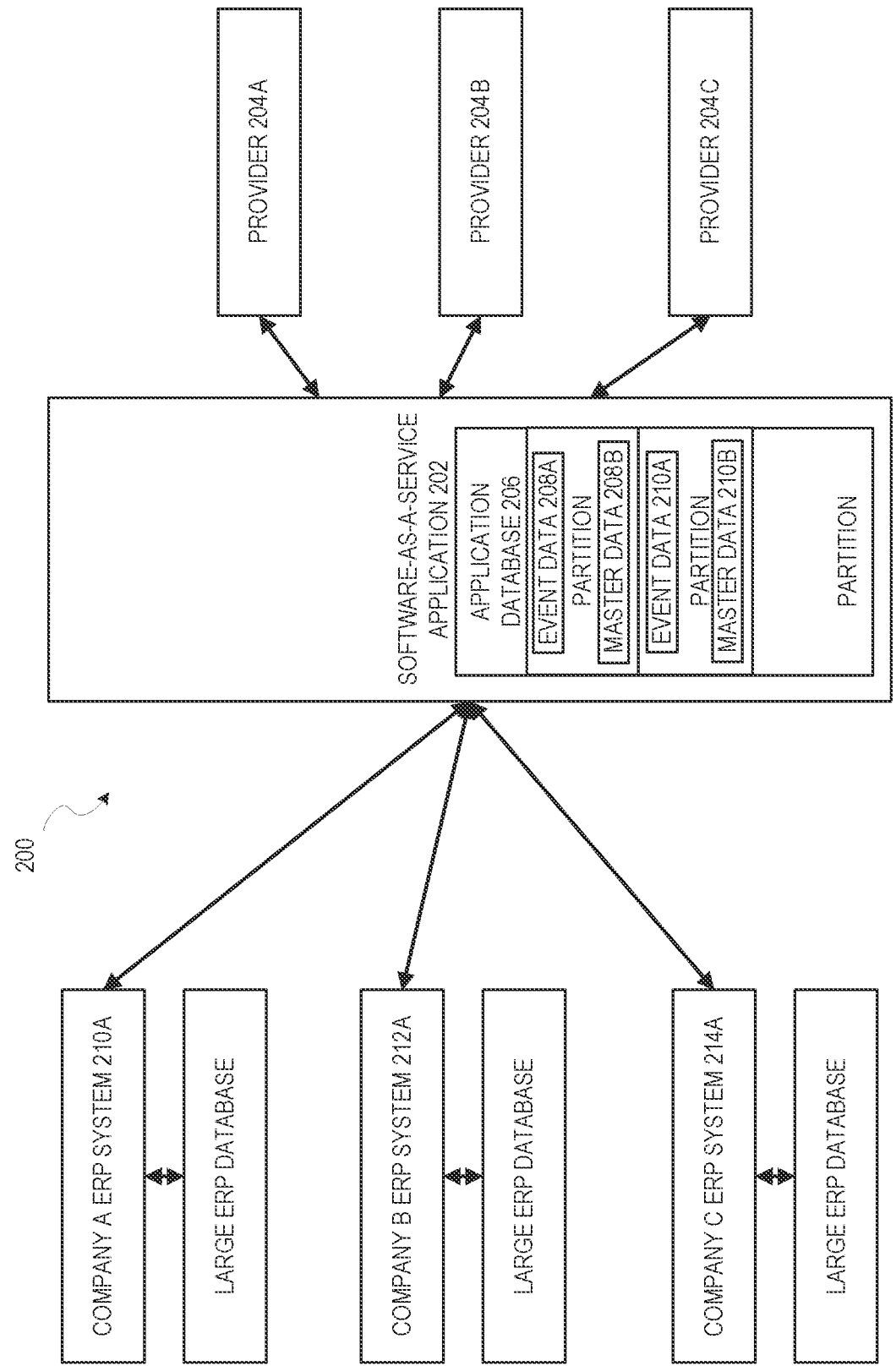
FIG. 2 is a block diagram illustrating an architecture for implementing intelligent master data replication, in accordance with an example embodiment.

FIG. 2 is a block diagram illustrating an architecture 200 for implementing intelligent master data replication, in accordance with an example embodiment. Here, rather than provider Z operating a SaaS application, a third-party software provider operates a SaaS application 202 and offers its services to multiple providers 204A-204C. Here, SaaS application 202 also contains its own application database 206, but the application database 206 may segregate data stored within it based on provider. In some example embodiments, this application database 206 may be a multi-tenant database. In a multi-tenant database, each tenant's data is isolated and remains invisible and inaccessible to other tenant data. Thus, here, event data 208A and master data 208B stored for provider 204A may be stored in a partition of application database 206 that is separate from the event data 210A and master data 210B stored for provider 204C.

In an example embodiment, SaaS application 202, operated by the third party, replicates only required data for the appropriate providers 204A-204C into the application database 206.

As an example, provider 204A provides an application that generates a questionnaire to send to customers of various companies, while provider 204B provides an application that generates a newsletter to send to customers of various companies. Each provider 204A-204C may utilize data from company A ERP system 210A, company B ERP system 212A, and company C ERP system 214A, or just a subset of these systems. It should be noted that in some example embodiments each tenant could have multiple ERP systems.

Figure 3:
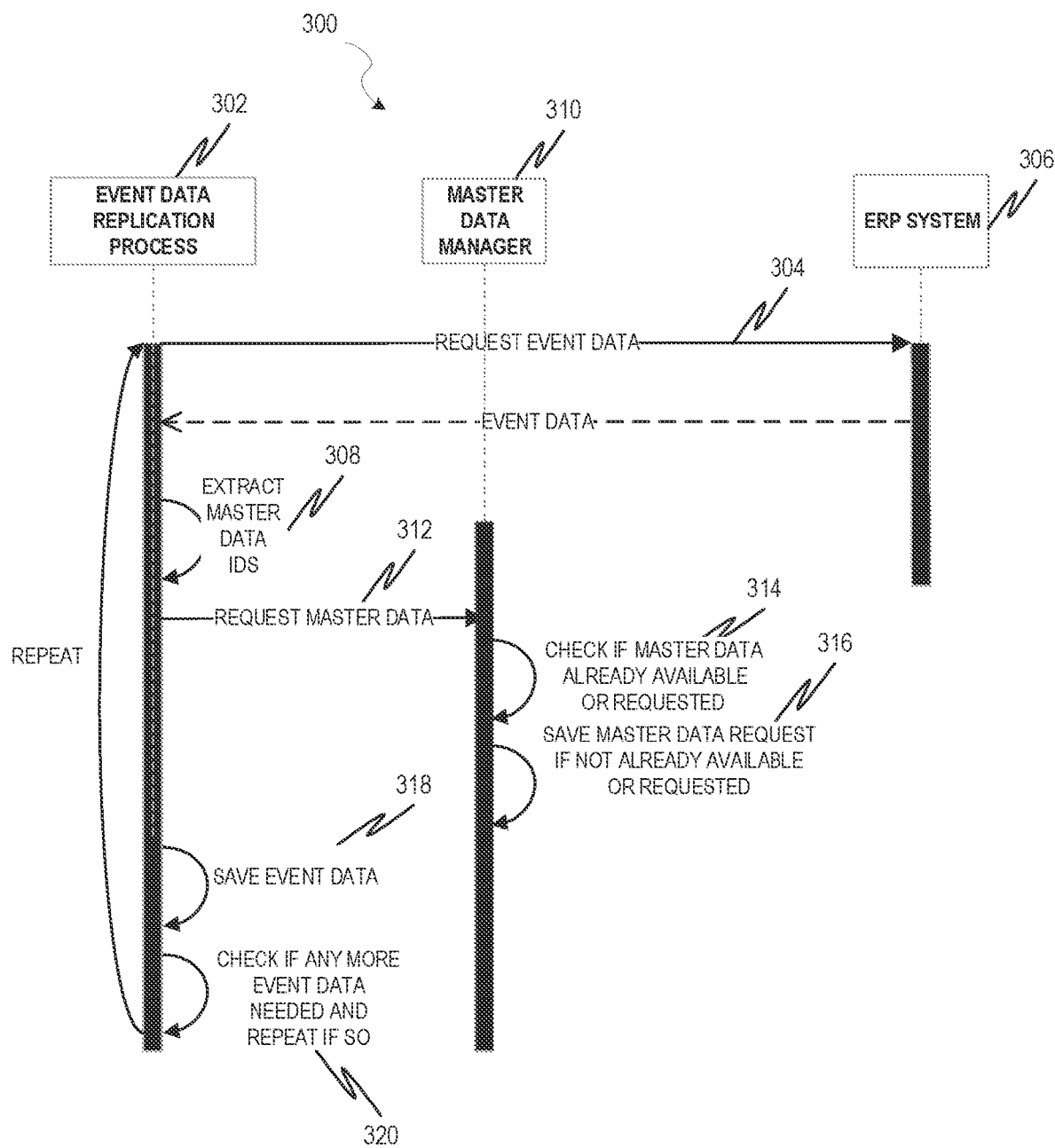
FIG. 3 is a ladder diagram illustrating a method of requesting master data when replicating data, in accordance with an example embodiment.

FIG. 3 is a ladder diagram illustrating a method 300 of requesting master data when replicating data, in accordance with an example embodiment. At operation 304, an event data replication process 302 (which may be running on the SaaS application of the provider, or at least in an application accessible by the SaaS application), may request event data from an ERP system 306. This method 300 may be triggered by a replication request. The data replication process 302 may then extract the identifications of master data that is referenced in the event data at operation 308. The data replication process 302 then requests the master data records corresponding to the extracted identifications from a master data manager 310 at operation 312. At operation 314, the master data manager 310 checks whether the requested master data is already available in the application database or has already been requested. As will be seen, the master data requests will be sent in batches, so if a particular piece of master data is already part of a request that will go out in the next batch, there is no need to save the newer request as that would just result in duplicate requests. Likewise, a particular piece of master data may already be contained in the application database as retrieved with a prior batch of requests, and thus in that case, there is no need to save the newer request as the data need not be retrieved. Thus, the request saved at 316 if the requested master data is not already available in the application database or already requested. If the data is read in chunks rather than batches, the request for the master data can also be performed by requesting one chunk after another, and the only relevant determination would be whether the chunk is already contained in the application database. In some example embodiments, the application database may store rules that can be used to determine whether the master data has already been requested. These rules may differ based on the master data type, which defines a different structure for each type of master data.

After this is complete, at operation 318, the event data replication process 302 may save the event data. At operation 320, the event data replication process 302 may determine if there is any more event data available. If not, then event data replication has finished. If so, the method 300 may loop back to operation 304 for the next piece of event data.

In one example embodiment, an optimization may be performed for changing event data. Specifically, if a user opens a user interface with a form representing the event data, one filed may represent master data. An option may be provided that allows the user to browse all valid values for an input field upfront and choose one of them, which makes it easier for the user to change that field. One technical issue that arises regarding this is that the replication database cannot provide the data for this optimization as only a subset is stored. Thus, the queries should be sent to the ERP system directly. Thus, for these purposes, the data fetched from the ERP directly.

Figure 4:
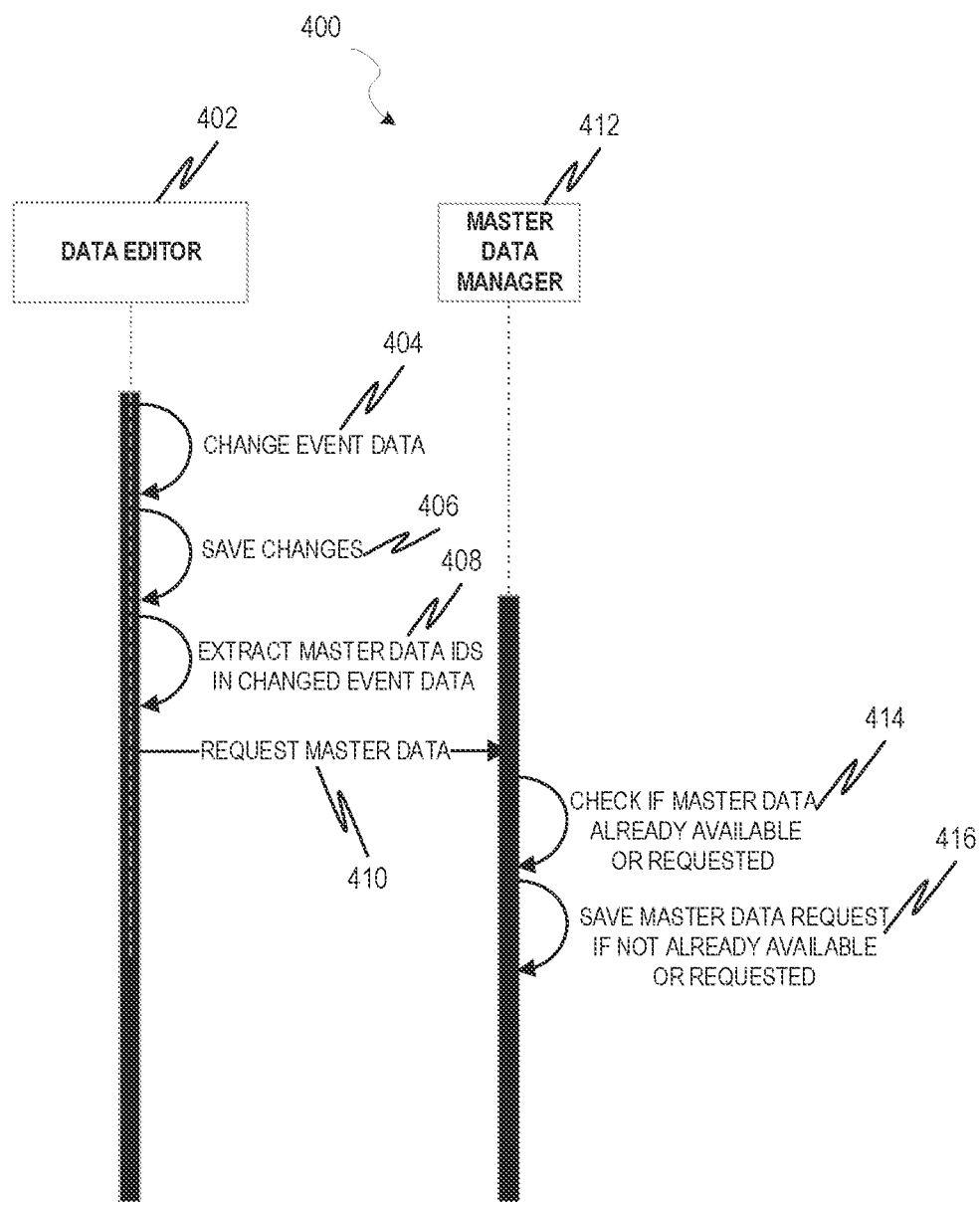
FIG. 4 is a ladder diagram illustrating a method of requesting master data when changing data, in accordance with an example embodiment.

FIG. 4 is a ladder diagram illustrating a method 400 of requesting master data when changing data, in accordance with an example embodiment. Specifically, a data editor 402 may change the event data at operation 404 and save the changes at operation 406. At operation 408, the data editor 402 may extract master data identifications referenced in the changed event data. At operation 410, the data editor 402 may request the corresponding master data records from the master data manager 412. At operation 414, the master data manager 412 checks whether the required master data is already available or requested. If not, then the request is saved at operation 416.

Figure 5:
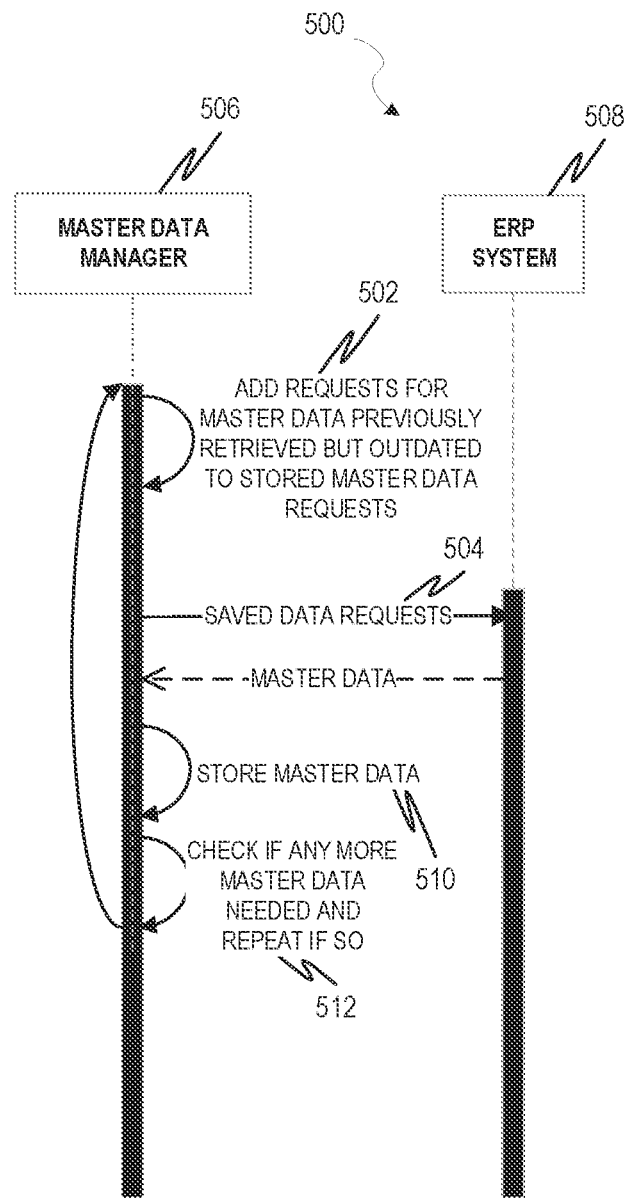
FIG. 5 is a ladder diagram illustrating a method of replicating master data, in accordance with an example embodiment.

FIG. 5 is a ladder diagram illustrating a method 500 of replicating master data, in accordance with an example embodiment. As indicated earlier, there may be a number of stored master data requests that will need to be executed to retrieve the needed master data. In addition to that, some of the master data stored in the application database may need to be updated, even if it is not part of the stored master data requests. At operation 502, requests for any master data that was previously retrieved (i.e., it is already stored in the application store) but is outdated may be added to the stored master data requests. Master data is outdated if it was last replicated longer than a preset time period ago. This period can be defined in the customizing of the master data manager. At operation 504, the saved requests for master data can be sent from the master data manager 506 to the ERP system 508 to retrieve the corresponding master data. If a master data record is no longer available, it can be marked accordingly. At operation 510, the master data manager 506 may store the retrieved master data. At operation 512, it is determined if there is any more requested master data. If so, the method 500 loops back to operation 502. If not, then the method 500 ends.

Figure 6:
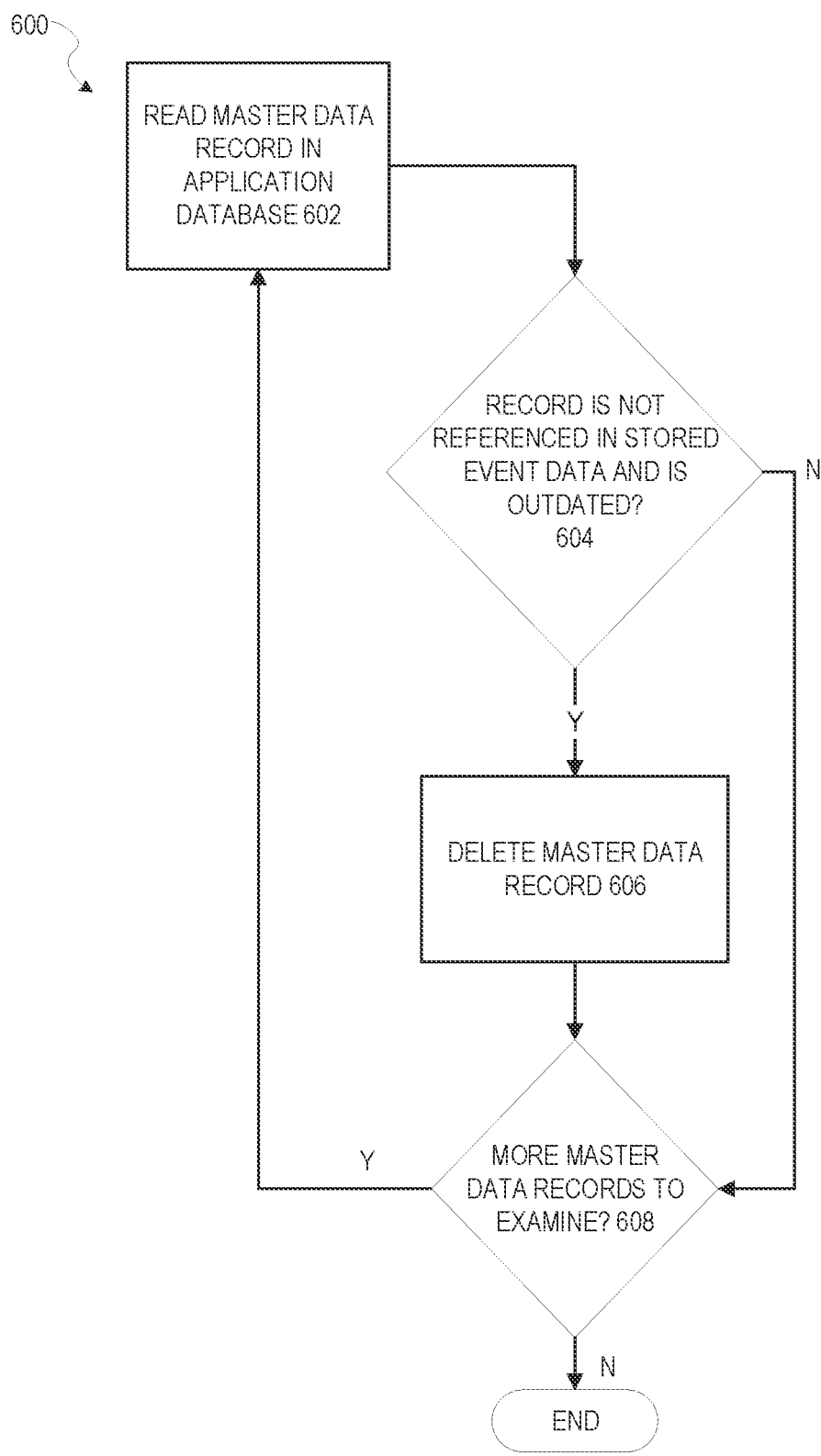
FIG. 6 is a ladder diagram illustrating a method of performing master data maintenance, in accordance with an example embodiment.

FIG. 6 is a flow diagram illustrating a method 600 of performing master data maintenance, in accordance with an example embodiment. This method 600 may be performed periodically, such as daily. At operation 602, a master data record in the application database is read. At operation 604, it is determined whether the record is not referenced in the stored event data and is outdated. If both are true, then at operation 606, that master data record is deleted. The record may be kept if it is either still referenced in the stored event data or is not outdated. At operation 608, it is determined if there are more master data records in the application database to examine. If so, the method 600 loops back to operation 602 for the next master data record in the application database. If not, then the method 600 ends.

The operations of FIGS. 3-6 may be performed by any microservice. Thus, this solution enables a cloud-based extension of an ERP system to store and provide master data very efficiently. Only master data that is needed is replicated. The replication does not have to be performed all at once; rather, only the needed master data is retrieved, which alleviates the processor and network load. By deleting any master data records that are outdated and no longer referenced, the data volume can be kept as minimal as possible.

Figure 7:
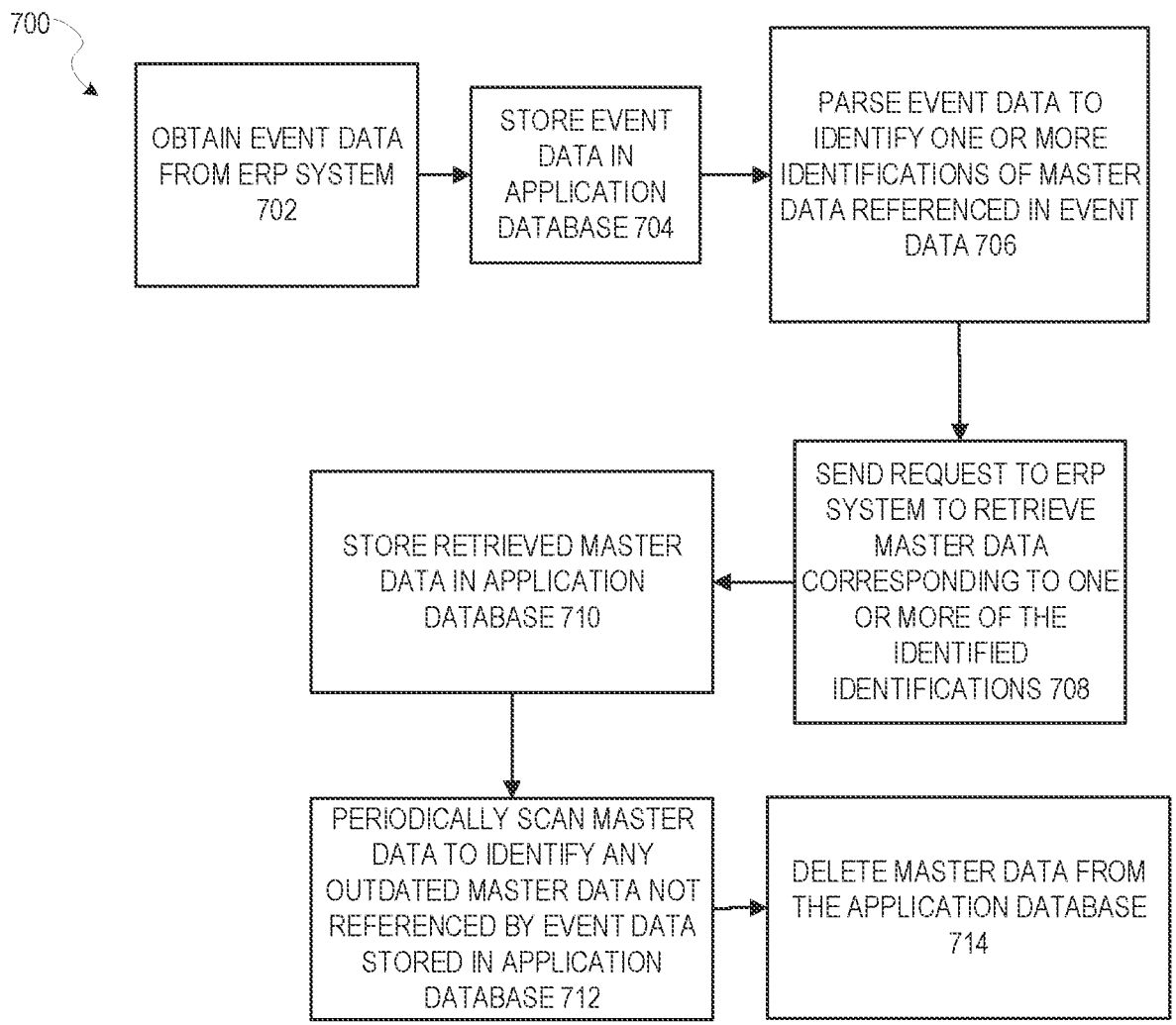
FIG. 7 is a flow diagram illustrating a method for replicating master data, in accordance with an example embodiment.

FIG. 7 is a flow diagram illustrating a method 700 for replicating master data, in accordance with an example embodiment. The method 700 may be performed by a master data manager in a cloud-based application. At operation 702, event data is obtained from an ERP system. At operation 704, the event data is stored in an application database managed by the cloud-based application. At operation 706, the event data is parsed to identify one or more identifications of master data referenced in the event data, with the master data being stored in a database by the ERP system. At operation 708, a request is sent to the ERP system to retrieve master data corresponding to one or more of the identified identifications. In some example embodiments, the application database further contains a different set of rules for each type of master data, wherein each type of master data has a different structure, with the rules indicating how to determine whether the corresponding master data has already been requested. In such embodiments, the sending a request to the ERP system to retrieve master data corresponding to one or more of the identified identifications is not performed for any identified identifications whose corresponding master data has already been request, based on the rules for the corresponding master data type.

At operation 710, the retrieved master data is stored in the application database managed by the cloud-based application. At operation 712, master data stored in the application database is periodically scanned to identify any master data that is outdated and not referenced by event data stored in the application database. Master data is outdated if it was last replicated longer than a preset time period ago. At operation 714, any identified master data is deleted from the application database.

Figure 8:
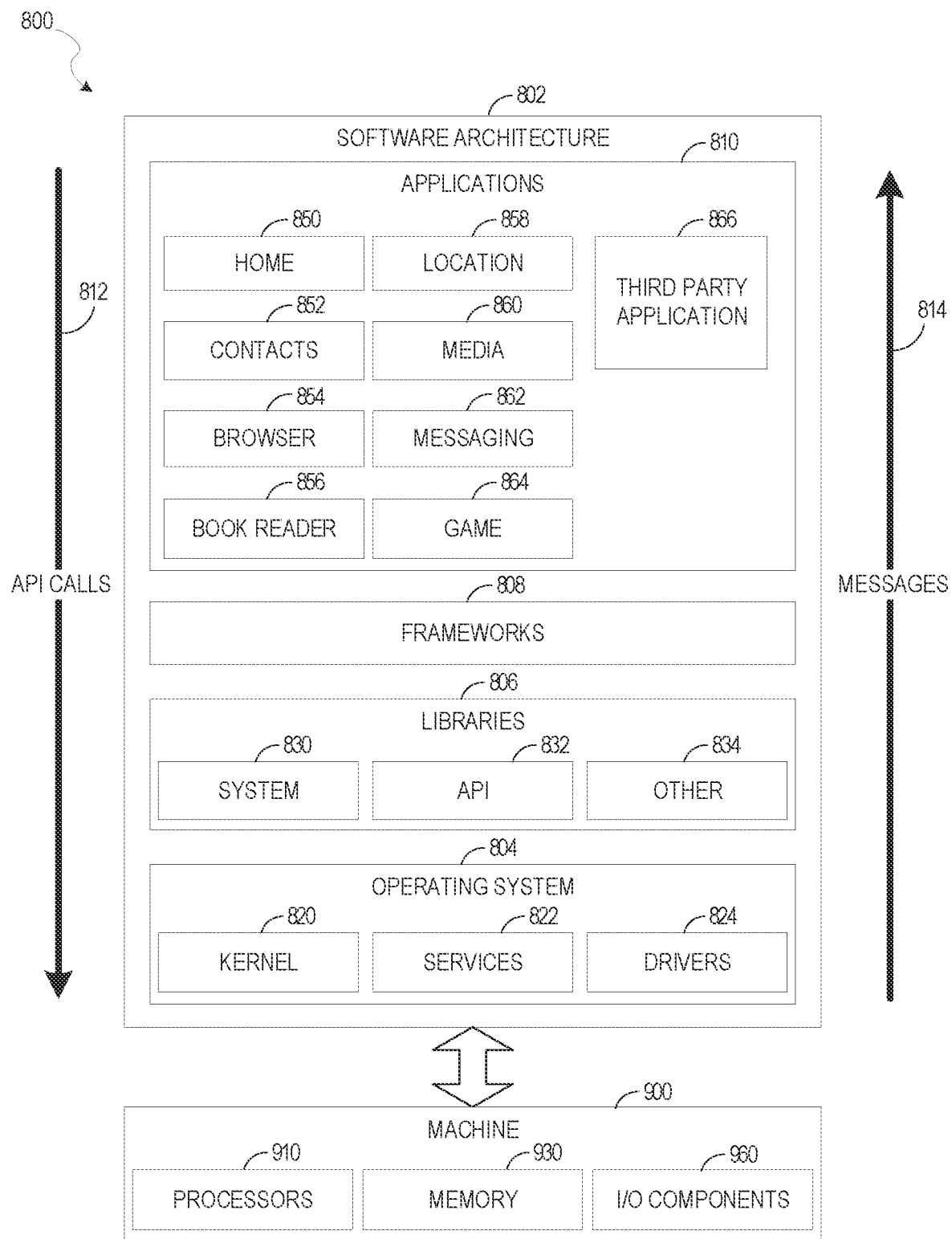
FIG. 8 is a block diagram illustrating an architecture of software, which can be installed on any one or more of the devices described above.

FIG. 8 is a block diagram 800 illustrating an architecture of software 802, which can be installed on any one or more of the devices described above. FIG. 8 is merely a non-limiting example of a software architecture, and it will be appreciated that many other architectures can be implemented to facilitate the functionality described herein. In various embodiments, the software 802 is implemented by hardware such as a machine 900 of FIG. 9 that includes processors 910, memory 930, and input/output (I/O) components 950. In this example architecture, the software 802 can be conceptualized as a stack of layers where each layer may provide a particular functionality. For example, the software architecture 802 includes layers such as an operating system 804, libraries 806, frameworks 808, and applications 810. Operationally, the applications 810 invoke application programming interface (API) calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various graphical user interface (GUI) functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 9:
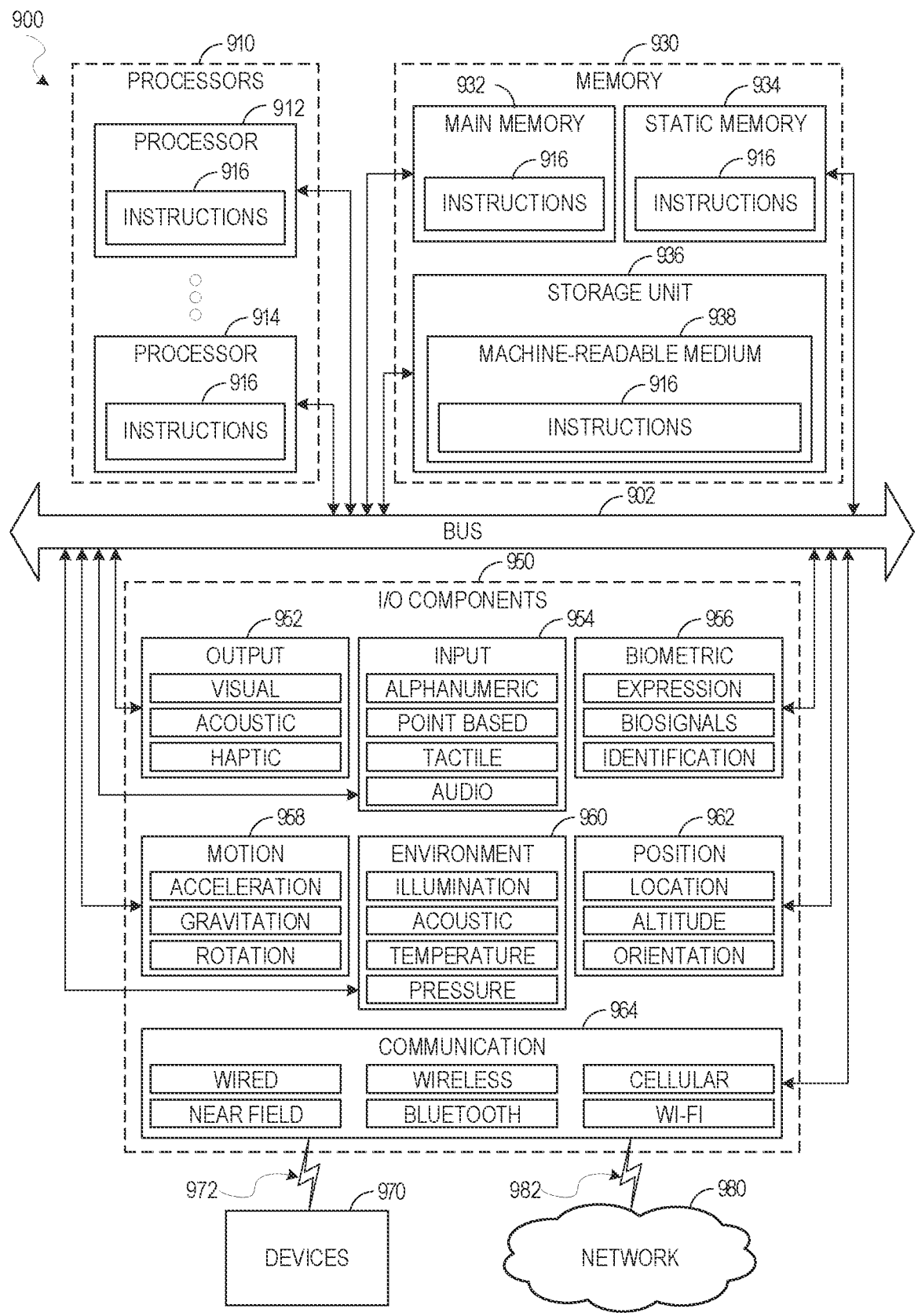
FIG. 9 illustrates a diagrammatic representation of a machine in the form of a computer system within which a set of instructions may be executed for causing the machine to perform any one or more of the methodologies discussed herein, according to an example embodiment.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the method 700 of FIG. 7. Additionally, or alternatively, the instructions 916 may implement FIGS. 1-7 and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions 916 contemporaneously. Although FIG. 9 shows multiple processors 910, the machine 900 may include a single processor 912 with a single core, a single processor 912 with multiple cores (e.g., a multi-core processor 912), multiple processors 912, 914 with a single core, multiple processors 912, 914 with multiple cores, or any combination thereof.

The memory 930 may include a main memory 932, a static memory 934, and a storage unit 936, each accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., coupled via a USB).

Moreover, the communication components 964 may detect identifiers or include components operable to detect identifiers. For example, the communication components 964 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

The various memories (i.e., 930, 932, 934, and/or memory of the processor(s) 910) and/or the storage unit 936 may store one or more sets of instructions 916 and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks, and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

In view of the above described implementations of subject matter this application discloses the following list of examples, wherein one feature of an example in isolation or more than one feature of an example taken in combination and, optionally, in combination with one or more features of one or more further examples, are further examples also falling within the disclosure of this application.

EXAMPLES

Example 1. A system comprising:
  at least one hardware processor; and
  a computer-readable medium storing instructions that, when executed by the at least one hardware processor, cause the at least one hardware processor to perform operations comprising:
  obtaining, at a cloud-based application, event data from an Enterprise Resource Planning (ERP) system;
  storing the event data in an application database managed by the cloud-based application;
  parsing the event data to identify one or more identifications of master data referenced in the event data, the master data being stored in a database by the ERP system;
  sending a request to the ERP system to retrieve master data corresponding to one or more of the identified identifications;
  storing the retrieved master data in the application database managed by the cloud-based application;
  periodically scanning master data stored in the application database to identify any master data that is outdated and not referenced by event data stored in the application database; and
  deleting any identified master data from the application database.

Example 2. The system of Example 1, wherein master data is outdated if it was last replicated longer than a preset time period ago.

Example 3. The system of Examples 1 or 2, wherein the cloud-based application maintains event data for multiple different providers, with the event data segregated in the application database based on provider.

Example 4. The system of Example 3, wherein the retrieved master data is further segregated in the application database based on provider.

Example 5. The system of any of Examples 1-4, wherein the operations are triggered by a replication request.

Example 6. The system of any of Examples 1-5, wherein the application database further contains a different set of rules for each type of master data, wherein each type of master data has a different structure, the rules indicating how to determine whether the corresponding master data has already been requested.

Example 7. The system of Example 6, wherein the sending a request to the ERP system to retrieve master data corresponding to one or more of the identified identifications is not performed for any identified identifications whose corresponding master data has already been requested, based on the rules for the corresponding master data type.

Example 8. A method comprising:
  obtaining, at a cloud-based application, event data from an Enterprise Resource Planning (ERP) system;
  storing the event data in an application database managed by the cloud-based application;

parsing the event data to identify one or more identifications of master data referenced in the event data, the master data being stored in a database by the ERP system;
sending a request to the ERP system to retrieve master data corresponding to one or more of the identified identifications;
storing the retrieved master data in the application database managed by the cloud-based application;
periodically scanning master data stored in the application database to identify any master data that is outdated and not referenced by event data stored in the application database; and deleting any identified master data from the application database.

Example 9. The method of Example 8, wherein master data is outdated if it was last replicated longer than a preset time period ago.

Example 10. The method of Examples 8 or 9, wherein the cloud-based application maintains event data for multiple different providers, with the event data segregated in the application database based on provider.

Example 11. The method of Example 10, wherein the retrieved master data is further segregated in the application database based on provider.

Example 12. The method of any of Examples 8-11, wherein the operations are triggered by a replication request.

Example 13. The method of any of Examples 8-12, wherein the application database further contains a different set of rules for each type of master data, wherein each type of master data has a different structure, the rules indicating how to determine whether the corresponding master data has already been requested.

Example 14. The method of Example 13, wherein the sending a request to the ERP system to retrieve master data corresponding to one or more of the identified identifications is not performed for any identified identifications whose corresponding master data has already been requested, based on the rules for the corresponding master data type.

Example 15. A non-transitory machine-readable medium storing instructions which, when executed by one or more processors, cause the one or more processors to perform operations comprising:
obtaining, at a cloud-based application, event data from an Enterprise Resource Planning (ERP) system;
storing the event data in an application database managed by the cloud-based application;
parsing the event data to identify one or more identifications of master data referenced in the event data, the master data being stored in a database by the ERP system;
sending a request to the ERP system to retrieve master data corresponding to one or more of the identified identifications;
storing the retrieved master data in the application database managed by the cloud-based application;
periodically scanning master data stored in the application database to identify any master data that is outdated and not referenced by event data stored in the application database; and
deleting any identified master data from the application database.

Example 16. The non-transitory machine-readable medium of Example 15, wherein master data is outdated if it was last replicated longer than a preset time period ago.

Example 17. The non-transitory machine-readable medium of Examples 15 or 16, wherein the cloud-based application maintains event data for multiple different providers, with the event data segregated in the application database based on provider.

Example 18. The non-transitory machine-readable medium of Example 17, wherein the retrieved master data is further segregated in the application database based on provider.

Example 19. The non-transitory machine-readable medium of any of Examples 15-18, wherein the operations are triggered by a replication request.

Example 20. The non-transitory machine-readable medium of any of Examples 15-19, wherein the application database further contains a different set of rules for each type of master data, wherein each type of master data has a different structure, the rules indicating how to determine whether the corresponding master data has already been requested.

What is claimed is:

1. A system comprising:
at least one hardware processor; and
a computer-readable medium storing instructions that, when executed by the at least one hardware processor, cause the at least one hardware processor to perform operations comprising:
obtaining, at a cloud-based application, event data from an Enterprise Resource Planning (ERP) system;
storing the event data in an application database managed by the cloud-based application;
parsing the event data to identify one or more identifications of master data referenced in the event data, the master data being stored in a database by the ERP system;
sending a request to the ERP system to retrieve master data corresponding to one or more of the identified identifications;
storing the retrieved master data in the application database managed by the cloud-based application;
periodically scanning master data stored in the application database to identify any master data that is outdated and not referenced by event data stored in the application database; and
deleting any identified master data from the application database.

2. The system of claim 1, wherein master data is outdated if it was last replicated longer than a preset time period ago.

3. The system of claim 1, wherein the cloud-based application maintains event data for multiple different providers, with the event data segregated in the application database based on provider.

4. The system of claim 3, wherein the retrieved master data is further segregated in the application database based on provider.

5. The system of any of claim 1, wherein the operations are triggered by a replication request.

6. The system of claim 1, wherein the application database further contains a different set of rules for each type of master data, wherein each type of master data has a different structure, the rules indicating how to determine whether the corresponding master data has already been requested.

7. The system of claim 6, wherein the sending a request to the ERP system to retrieve master data corresponding to one or more of the identified identifications is not performed for any identified identifications whose corresponding master data has already been requested, based on the rules for the corresponding master data type.

8. A method comprising:
obtaining, at a cloud-based application, event data from an Enterprise Resource Planning (ERP) system;

storing the event data in an application database managed by the cloud-based application;

parsing the event data to identify one or more identifications of master data referenced in the event data, the master data being stored in a database by the ERP system;

sending a request to the ERP system to retrieve master data corresponding to one or more of the identified identifications;

storing the retrieved master data in the application database managed by the cloud-based application;

periodically scanning master data stored in the application database to identify any master data that is outdated and not referenced by event data stored in the application database; and deleting any identified master data from the application database.

9. The method of claim 8, wherein master data is outdated if it was last replicated longer than a preset time period ago.

10. The method of claim 8, wherein the cloud-based application maintains event data for multiple different providers, with the event data segregated in the application database based on provider.

11. The method of claim 10, wherein the retrieved master data is further segregated in the application database based on provider.

12. The method of any of claim 8, wherein the operations are triggered by a replication request.

13. The method of any of claim 8, wherein the application database further contains a different set of rules for each type of master data, wherein each type of master data has a different structure, the rules indicating how to determine whether the corresponding master data has already been requested.

14. The method of claim 13, wherein the sending a request to the ERP system to retrieve master data corresponding to one or more of the identified identifications is not performed for any identified identifications whose corresponding master data has already been requested, based on the rules for the corresponding master data type.

15. A non-transitory machine-readable medium storing instructions which, when executed by one or more processors, cause the one or more processors to perform operations comprising:

obtaining, at a cloud-based application, event data from an Enterprise Resource Planning (ERP) system;

storing the event data in an application database managed by the cloud-based application;

parsing the event data to identify one or more identifications of master data referenced in the event data, the master data being stored in a database by the ERP system;

sending a request to the ERP system to retrieve master data corresponding to one or more of the identified identifications;

storing the retrieved master data in the application database managed by the cloud-based application;

periodically scanning master data stored in the application database to identify any master data that is outdated and not referenced by event data stored in the application database; and deleting any identified master data from the application database.

16. The non-transitory machine-readable medium of claim 15, wherein master data is outdated if it was last replicated longer than a preset time period ago.

17. The non-transitory machine-readable medium of claim 15, wherein the cloud-based application maintains event data for multiple different providers, with the event data segregated in the application database based on provider.

18. The non-transitory machine-readable medium of claim 17, wherein the retrieved master data is further segregated in the application database based on provider.

19. The non-transitory machine-readable medium of any of claim 15, wherein the operations are triggered by a replication request.

20. The non-transitory machine-readable medium of any of claim 15, wherein the application database further contains a different set of rules for each type of master data, wherein each type of master data has a different structure, the rules indicating how to determine whether the corresponding master data has already been requested.

\* \* \* \* \*